United States Patent [19]

Wester

[11] Patent Number: 5,729,298
[45] Date of Patent: Mar. 17, 1998

[54] TELETEXT DECODER WITH PAGE UPDATE INDICATION

[75] Inventor: Rogatus H. H. Wester, Eindhoven, Netherlands

[73] Assignee: U.S. Philips Corporation, New York, N.Y.

[21] Appl. No.: 668,427

[22] Filed: Jun. 14, 1996

Related U.S. Application Data

[63] Continuation of Ser. No. 396,359, Feb. 28, 1995, which is a continuation of Ser. No. 187,886, Jan. 28, 1994.

[30] Foreign Application Priority Data

Feb. 1, 1993 [EP] European Pat. Off. .............. 93200252

[51] Int. Cl.⁶ ........................................... H04N 7/087
[52] U.S. Cl. ........................................... 348/468; 348/469
[58] Field of Search ........................... 348/461, 465, 348/466, 467, 468, 469, 473–486, 553, 563

[56] References Cited

U.S. PATENT DOCUMENTS

| | | | |
|---|---|---|---|
| 4,337,485 | 6/1982 | Chambers | 358/147 |
| 4,633,297 | 12/1986 | Sterlos et al. | 348/569 |
| 4,953,022 | 8/1990 | Bugg | 348/468 |
| 5,038,212 | 8/1991 | Van Den Hambergh et al. | 348/468 |
| 5,208,567 | 5/1993 | Tarrant | 348/465 |
| 5,237,411 | 8/1993 | Fink et al. | 348/461 |
| 5,374,961 | 12/1994 | Jung | 348/468 |
| 5,410,359 | 4/1995 | Odijk et al. | 348/468 |

FOREIGN PATENT DOCUMENTS

| | | | |
|---|---|---|---|
| 62-076987 | 4/1987 | Japan | H04N 7/08 |
| 1018380 | 1/1989 | Japan | H04N 7/08 |
| 1202992 | 8/1989 | Japan | H04N 7/08 |
| 03026187 | 2/1991 | Japan | H04N 7/08 |
| 3026187 | 2/1991 | Japan | H04N 7/08 |
| 3214983 | 9/1991 | Japan | H04N 7/08 |

OTHER PUBLICATIONS

"VPV–Videotext Programs Video Recorder" IEEE Transactions on Consumer Electronics, vol. 34, No. 3, Aug. 1988.
Technical Publication 112 "Computer Controlled Teletext (CCT)", Philips Electronic Components and Materials.
"Broadcast Teletext Specification", British Broadcasting Corporation, Sep. 1976, pp. 1–20.

Primary Examiner—John K. Peng
Assistant Examiner—Nathan J. Flynn
Attorney, Agent, or Firm—Michael E. Marion

[57] ABSTRACT

A television receiver including a teletext decoder for receiving and displaying teletext pages for signalling that a requested teletext has been changed or not changed with respect to the previous consultation of the relevant page. To this end the receiver forms a checkword upon reception of a teletext page, which checkword is representative of the contents of the page, and compares this with the checkword stored upon previous display of the page.

6 Claims, 5 Drawing Sheets

TELETEXT DECODER WITH PAGE UPDATE INDICATION

This is a continuation of application Ser. No. 08/396,359, filed Feb. 28, 1995 which is a continuation of Ser. No. 08/187,886 filed Jan. 28, 1994.

FIELD OF THE INVENTION

The invention relates to a television receiver including a teletext decoder for receiving and displaying teletext pages.

BACKGROUND OF THE INVENTION

Television receivers of the type mentioned in the opening paragraph are generally known. They enable the consumer to consult a large quantity of textual and graphic information. The information is accommodated in a plurality of teletext pages which are transmitted cyclically. Each individual page in the cycle has a page number enabling the user to select this page.

The World System Teletext standard used in many countries provides for the transmission of an Update Indicator for each teletext page. This is a 1-bit indicator which is set once by the page editor when the page contents are modified so as to indicate that the page has been modified with respect to its previous transmission. In television receivers this information is used to inform the user of the fact that the displayed page has been refreshed. While waiting for this information, the user may, for example watch the television program.

JP 3-214983 describes a teletext receiver which compares a transmitted revision flag with a corresponding stored bit. If they differ, it is inferred therefrom that the contents have been changed, which will be stated to the user.

Market research has proved that a majority of the public frequently consults teletext, for example several times a day. However, the contents of an individual teletext page are relatively seldom refreshed. Consequently, it regularly happens that a page selected by the user is found to have the same contents as in a previous session. The user does not notice this until after he has read the page. This is a nuisance. It is even frustrating to the user if, moreover, he has had to wait for the redundant information for some time. In fact, waiting times are customary in teletext.

SUMMARY OF THE INVENTION

It is an object of the invention to provide a television receiver which is considerably more user-friendly as regards its operation described hereinbefore.

To this end, the television receiver according to the invention comprises means for forming a checkword upon reception of a teletext page from the data codes constituting the contents of the page, means for storing the checkword upon display of a received teletext page in a memory location associated with the page, and means for comparing the checkword formed for the received page with the checkword stored for said page and for generating an attention signal in conformity therewith.

It is thereby achieved that, upon reception of a teletext page, the user's attention can be drawn to the fact that the relevant page has been modified or not modified with respect to the page he has previously consulted.

The checkword may be constituted from the data codes transmitted by the transmitter. It may alternatively be constituted from the data codes stored in a page memory after decoding. The checkword may further be constituted in various ways. In a possible embodiment the checkword is formed at the receiver end by the modulo-N checksum of the data codes. Another possibility is to compute a Cyclic Redundancy Check (CRC) of the data codes. It is to be noted that it is known per se to form a checksum or CRC of at least a pan of a teletext page. See, for example "VPV-Videotext programs video recorder" in IEEE Transactions on Consumer Electronics, vol. 34, no. 3, August 1988 (in which a checksum is described) and U.S. Pat. No. 4,337,485 (in which a CRC is described). In both cases it is a provision for fixing the integrity of received teletext data. To this end, the checksum or CRC formed is compared with a value transmitted by the transmitter.

The checkword may alternatively be formed at the transmitter end and be transmitted together with the corresponding page. This embodiment is attractive because the checkword then need not be computed in the television receiver but only read. Moreover, such a checkword can be protected against transmission errors by means of protection bits. Also in this embodiment the checkword may be in the form of a checksum or CRC. However, it is already sufficient when it takes the form of an ordinal number, for example a sequential modulo-N ordinal number which is raised upon every modification of the page.

A further embodiment of the television receiver is obtained if the receiver further comprises means ensuring that, upon reception of predetermined teletext pages, the checkword formed upon said reception is stored in a further memory location associated with the received page. With this embodiment the checkword for the predetermined pages (for example, preprogrammed preferred pages) is stored upon each reception. If one of the preferred pages is actually consulted, it can immediately be ascertained whether the version last transmitted is new with respect to the version last consulted. If this is not the case, it is very likely that also the page which is still to be received has not been refreshed. It is now possible to state this to the user even before the requested page is received after the customary waiting time.

The same embodiment also enhances the ease of use of multipage teletext decoders in which the predetermined pages are acquired in advance and stored for later display without any waiting time. A page memory used for storing a page which has meanwhile been consulted can then be utilized temporarily for another page until the original page is refreshed again.

DETAILED DESCRIPTION OF THE PREFERRED EMBODIMENTS

Figure 1:
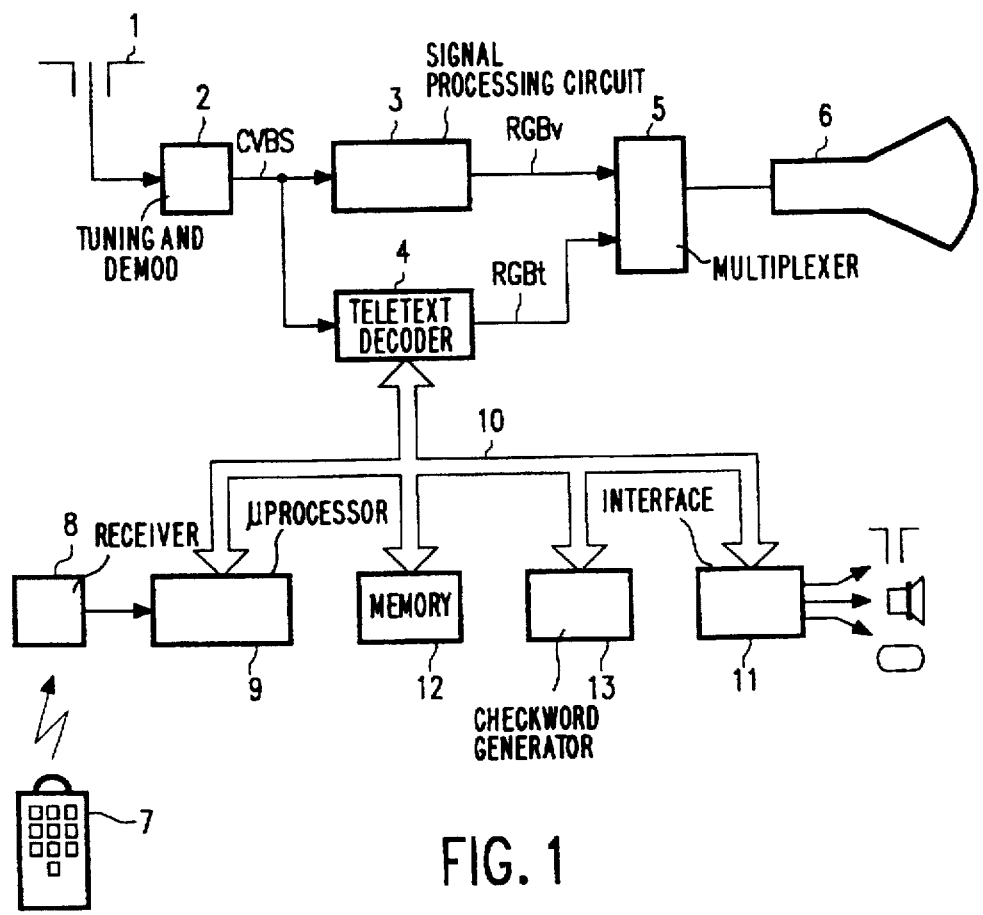
FIG. 1 shows the general structure of a television receiver including a teletext decoder according to the invention.

FIG. 1 shows the general structure of a television receiver including a teletext decoder according to the invention. The transmitter signals received at an antenna 1 are applied to a customary tuning and demodulation circuit 2. The obtained composite video signal CVBS of the selected television program is applied to a video signal processing circuit 3 and to a teletext decoder 4. In a normal television operating state of the receiver colour signals $RGB_v$ are applied to a display screen 6 from video signal processing circuit 3 via a multiplexer 5 so as to enable the user to watch the received television program. In a teletext operating state which can be called by the user, colour signals $RGB_t$ of the teletext decoder 4 are displayed on the display screen. Moreover, the television receiver comprises a section for sound reception and reproduction (not shown).

Operating instructions by the user are generated in a (remote-control) operating unit 7 and applied to a microprocessor 9 via a receiver circuit 8. Teletext decoder 4 is connected to this microprocessor by means of a bidirectional command bus 10. An interface 11 for tuning the receiver to stations, controlling picture brightness and sound volume, and the like is further connected to the command bus. This is shown by way of the appropriate symbols in the Figure. Moreover, the microprocessor is coupled via the command bus to a memory 12 and a checkword generator 13.

The teletext decoder 4 is, for example of the type as described in Technical Publication 112 "Computer Controlled Teletext (CCT)" of Philips Electronic Components and Materials. The decoder comprises a plurality of acquisition circuits each being able to look up a teletext page with a requested page number and store it in a page memory (not shown) coupled thereto. An interesting property of said type of decoder is that the page memories can be read and written by the microprocessor 9 via the command bus 10. More particularly, the character codes of a received teletext page can be read by the microprocessor. Moreover, locally generated "On Screen Display" messages can be applied to the teletext decoder 4 for the purpose of display.

Figure 2A:
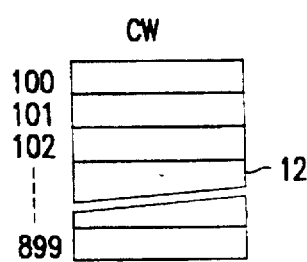
FIG. 2A shows a possible divisions of a memory shown in FIG. 1.

FIG. 2A shows a possible division of the memory 12. For each teletext page number p (p=100 ... 899) the memory has a memory location for storing a multi-bit checkword CW(p). The memory is preferably non-volatile so that the stored data are preserved also after switching off, or at least in the standby mode, of the receiver. It is assumed that upon first use of the receiver all memory locations CW(100) CW(899) have a predetermined initial value, for example the value 0. The division shown in FIG. 2B will be explained hereinafter.

Figure 3:
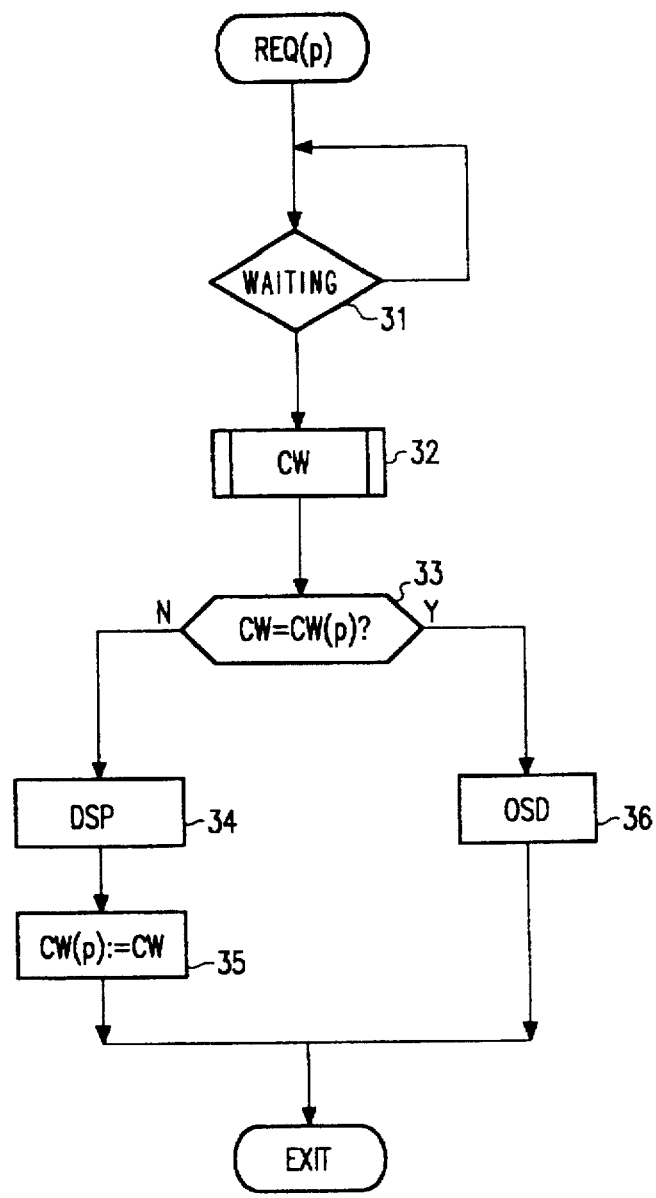
FIG. 3 shows a flow chart to explain a control program performed by a microprocessor shown in FIG. 1.

The operation of the television receiver shown in FIG. 1 is based on a control program stored in the microprocessor 9. This control program is generally known in so far as it is adapted to tune to stations and control picture and sound. Therefore, the control program will hereinafter be described only in so far as the television receiver is in the teletext operating mode. More particularly, FIG. 3 shows the flow chart of a page request program REQ(p) which is performed in the teletext operating mode after the user has entered a page number p. In a waiting loop 31 a waiting time is observed for the reception of this page. The page is stored in a page memory of the teletext decoder. Subsequently a check routine 32 is performed. In this check routine, the character codes, which jointly constitute the contents of the received page, are read by the microprocessor and successively applied to the checkword generator 13 (see FIG. 1). The contents of a page are constituted, for example by the character codes of the text rows 1 to 24 (possibly 25) as stored for display. If the page header, which is customary in World System Teletext, is considered to be part of the contents, the time indication occurring therein is to be excluded from the contents. Before continuing the description of the page request program, the operation of the checkword generator 13 will now be described first.

Figure 4A:
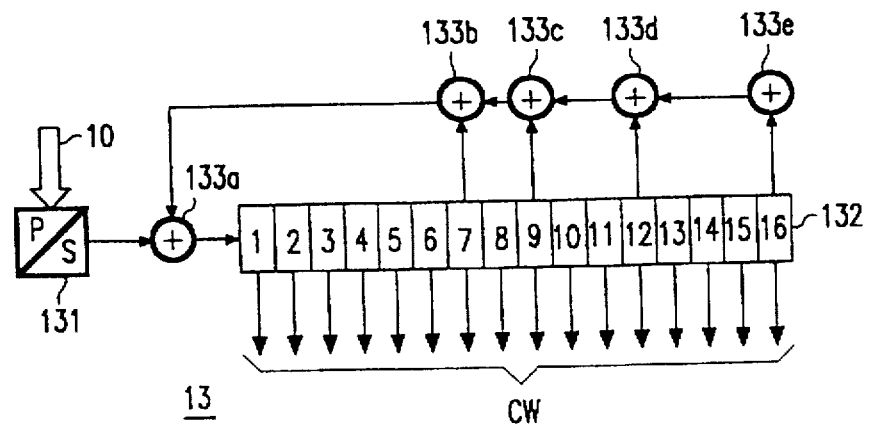
FIGS. 4A, 4B show some embodiments of a checkword generator shown in FIG. 1.
Figure 4B:
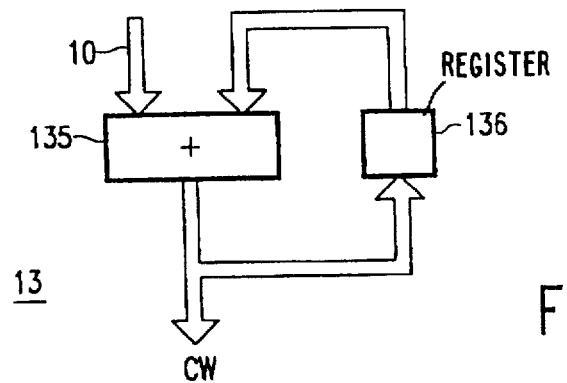

FIG. 4A shows a first embodiment of checkword generator 13. The generator comprises a parallel-series converter 131 which receives character codes of, for example 8 bits in a parallel format via the command bus 10. The generator further comprises a 16-bit shift register 132. Its input receives the modulo-2 sum of one bit of a character code and the contents of the 7th, 9th, 12th and 16th stage of the register. The modulo-2 sum is formed by modulo-2 adders 133a–133e. The shift register is initially given the value 0 by means of a reset signal (not shown). After all bits of all character codes have been successively applied to the generator, the register 132 comprises a 16-bit checkword CW, also referred to as Cyclic Redundancy Check. FIG. 4B shows a second embodiment of checkword generator 13. The generator now comprises an adder 135, a first input of which receives the 8-bit character codes via the command bus 10. The 8-bit output of the adder is fed back to the second input of the adder via a register 136. Register 136 is initially given the value 0 by means of a reset signal (not shown). After all character codes of the page have been successively applied to the generator, adder 135 supplies an 8-bit checkword CW in the form of a modulo-2 56 checksum. In the foregoing, the checkword comprises 16 and 8 bits, respectively. However, other bit numbers are alternatively possible. The likelihood of different pages supplying the same checkword decreases as the checkword comprises more bits.

In a further embodiment of the check routine 32, this routine solely comprises the reading of a checkword formed at the transmitter end and transmitted with the page. The transmitted checkword may also have the form of a CRC or checksum. However, in this case it may alternatively have the form of a sequential modulo-N ordinal number which is raised at the transmitter end whenever the page is refreshed.

Reverting to FIG. 3, it is found that the obtained checkword CW is compared in a step 33 of the request program with a value CW(p) which is stored in memory location p of memory 12 (see FIG. 2A). As already previously noted, CW(p) initially has a predetermined value, for example the value 0. The computed checkword will generally not have the value 0, so that steps 34 and 35 are performed. In the step 34 the teletext page which has just been received is displayed, thus enabling the user to consult it. In the step 35 the computed checkword CW is stored in the memory location CW(p). After this, the program is ended.

The teletext request program is always run through upon request of a new page. In this way a checkword for each consulted teletext page is stored in memory 12 (see FIG. 1) of the television receiver, which checkword is representative of the contents of said page. If the user consults the teletext program some time later again, the program shown in FIG. 3 is run through again for each page request. It is then very likely that the user will again request a number of previously consulted teletext pages. In this case two situations can be distinguished: p1 (i) If a requested page has exactly the same contents upon reception as the previously consulted page of the same page number p, the checkword CW of the received page, as formed in check routine 32, will be fully identical to the checkword CW(p) of this page previously stored in step 35. In that case the control program performs a step 36 in which an On-Screen-Display message is generated. In this message the user is notified of the fact that he has already seen the page before and that this page has (most likely) not been changed. If desired, the requested page may still be displayed, for example for possible other users of the television receiver. However, it is alternatively possible not to display the requested page. This is notably sensible if the page has been chosen from an index page. The index page will then remain on the display screen so that the user can immediately make another choice.

(ii) If a requested page has a different content upon reception than the previously consulted page of the same page number p, the checkword CW of the received page will most likely differ from the previously stored checkword CW(p) of this page. In that case the control program performs the above-described steps 34 and 35 in which the page is displayed and the new checkword is stored.

Figure 2B:
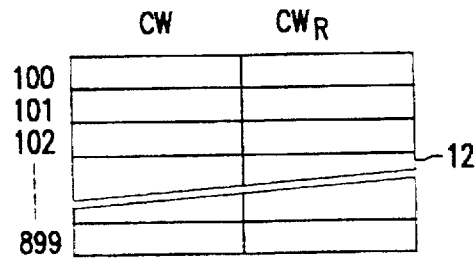
FIG. 2B shows an additional possible division of a memory shown in FIG. 1.

FIG. 2B shows a division of the memory 12 of FIG. 1 for a further embodiment of the television receiver according to the invention. The memory again has a memory location for each receivable teletext page number p for storing the checkword CW(p) which is representative of the contents of a consulted page. Moreover, the memory also has a second memory location for storing a further checkword $CW_R(p)$. As will be explained hereinafter, this further checkword is representative of the contents of a recently transmitted version of page p.

Figure 5:
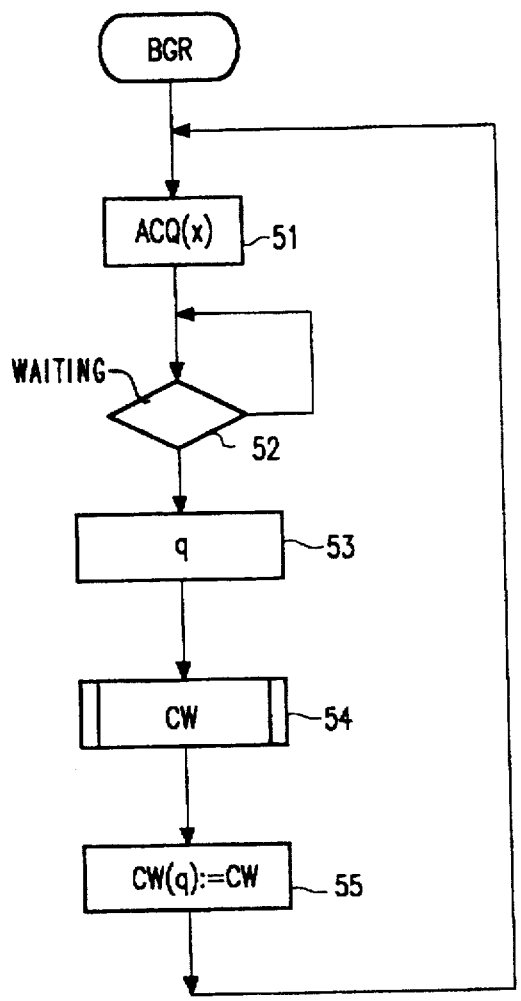
FIGS. 5 and 6 show flow charts to explain a further embodiment of the control program performed by the microprocessor shown in FIG. 1.

The teletext control program, which is performed by the microprocessor in this further embodiment of the television receiver, now comprises a page request program REQ(p) and a background program BGR. The background program BGR will first be described with reference to a flow chart which is shown in FIG. 5. In a first step 51 of the program the acquisition of page x is started. Here, x is a "don't care" page number. This means that the teletext decoder receives the next page of the broadcast, independent of its page number. In a waiting loop 52 of the program a waiting time is observed for the reception of the page, whereafter in a step 53 the page number q of the received page is fixed. For the sake of completeness it is to be noted that the received page is not shown. In a check routine 54 the checkword CW is formed in the manner already described hereinbefore from the contents of the received page. In a step 55, this checkword is stored in memory location $CW_R(q)$. Subsequently the program returns to the start so as to acquire a subsequent page. In this way a checkword for all transmitted pages is stored, which checkword is representative of the current contents. Page number x may alternatively be a predetermined page number, for example a page number from a list of preferred page numbers which have previously been programmed by the user. In that case the checkword of all preferred pages is stored.

Figure 6:
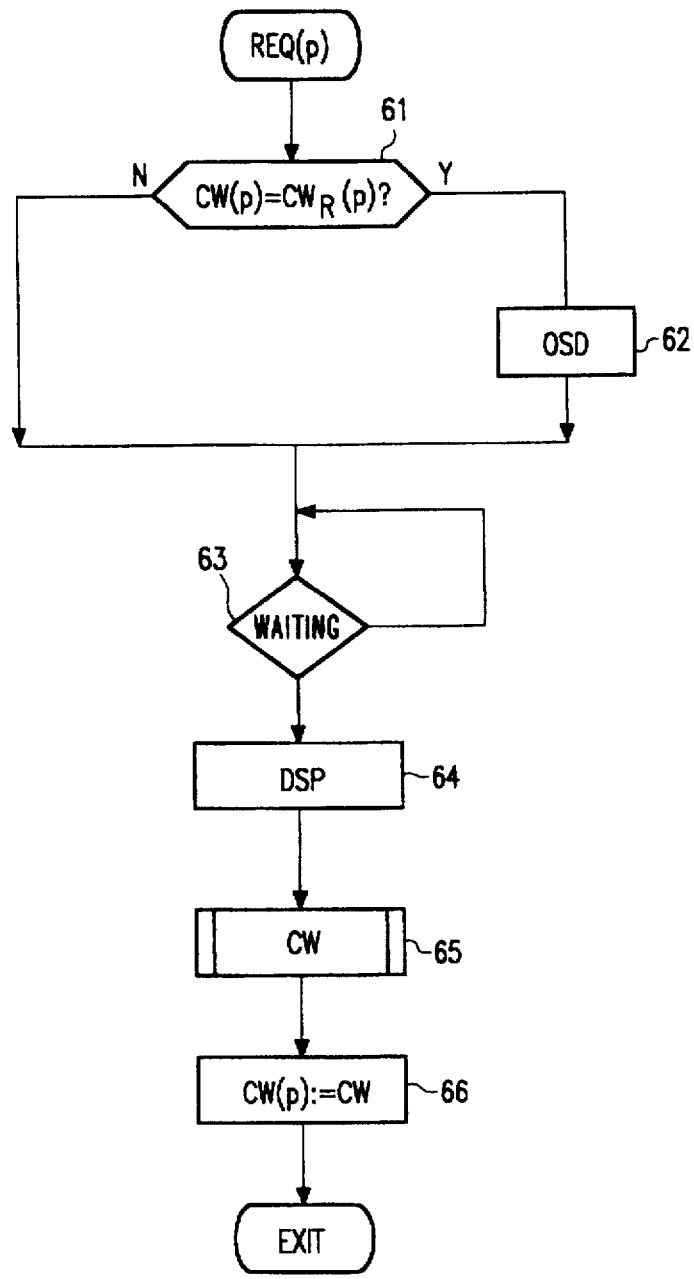

FIG. 6 shows the page request program REQ(p) which is performed as soon as the user requests a page with page number p. In a step 61 it is now checked whether the stored checkword $CW_R(p)$ is equal to the stored checkword CW(p). In other words, whether the contents of page p upon its most recent reception are still identical to those of the previously consulted page. In that case also the page p still to be received is most likely unchanged. In fact, teletext pages are transmitted at a high frequency (for example, every 20 to 30 seconds) but only refreshed at a low frequency (many pages remain unchanged for hours, sometimes even days). In a step 62 the user is informed that the page has not yet been refreshed. It should be emphasized that this information is given immediately after the page has been requested. The user can now decide not to wait for the reception of the page and make another choice. If it has been found in step 61 that the two checkwords do not correspond to each other, a waiting time is observed for the reception of the page (waiting loop 63) whereafter the page is displayed (step 64). Moreover, the checkword is formed (check routine 65) and stored (step 66) for the displayed page.

Finally it should be noted that various elements of the television receiver may alternatively be implemented in a different way than has been described in the foregoing. For example, the checkword generator 13 has been described as a hardware circuit. Those skilled in the art will be able to implement such a circuit also entirely in a software version. Moreover, the memory 12 need not necessarily have a memory location for each receivable page number. In practice, only a relatively small number of pages is consulted. It may then be more economical to store both the checkword and the associated page number in these memory locations. It is further feasible not to store the checkword of a displayed page until after this page has been displayed at least for a predetermined period of time, i.e. when it is most likely that the user has actually read the page.

I claim:

1. A television receiver including a teletext decoder for displaying a teletext page, said teletext page including a plurality of data codes, said teletext decoder comprising:

means for forming a checkword from said data codes upon receiving said teletext page in a first session;

a memory for storing said checkword upon displaying of said teletext page;

means for forming a further checkword from said data codes upon again selecting and receiving said teletext page in a further session; and means for comparing said checkword and said further checkword and for generating a control signal in conformity with the comparison.

2. The receiver of claim 1, wherein said data codes include a plurality of data code portions and wherein said checkword is formed by a modulo-N sum of said data code portions.

3. The receiver of claim 1, wherein said checkword is formed by a cyclic redundancy check of said data codes.

4. The receiver of claim 1, wherein said checkword is formed by a control portion of said data code.

5. The receiver of claim 4, wherein said control portion of said data code is generated prior to reception of said teletext page.

6. The receiver of claim 1, further including a further memory for storing a plurality of other checkwords, each of said other checkwords associated with a predetermined number of further teletext pages.

* * * * *